United States Patent
Zhang (10) Patent No.: US 8,838,941 B2
(45) Date of Patent: Sep. 16, 2014

(54) MULTI-THREAD PROCESSORS AND METHODS FOR INSTRUCTION EXECUTION AND SYNCHRONIZATION THEREIN AND COMPUTER PROGRAM PRODUCTS THEREOF

(75) Inventor: Yangang Zhang, Beijing (CN)

(73) Assignee: Via Technologies, Inc., New Taipei (TW)

( * ) Notice: Subject to any disclaimer, the term of this patent is extended or adjusted under 35 U.S.C. 154(b) by 861 days.

(21) Appl. No.: 13/042,996

(22) Filed: Mar. 8, 2011

(65) Prior Publication Data

US 2012/0233445 A1    Sep. 13, 2012

(30) Foreign Application Priority Data

Mar. 8, 2011   (CN) .......................... 2010 1 0531885

(51) Int. Cl.
G06F 7/38 (2006.01)
G06F 9/00 (2006.01)
G06F 9/44 (2006.01)
G06F 15/00 (2006.01)
G06F 9/38 (2006.01)
G06F 9/32 (2006.01)

(52) U.S. Cl.
CPC ............ *G06F 9/3851* (2013.01); *G06F 9/3859* (2013.01); *G06F 9/321* (2013.01); *G06F 9/3857* (2013.01)
USPC ....................................................... 712/220

(58) Field of Classification Search
None
See application file for complete search history.

(56) References Cited

U.S. PATENT DOCUMENTS 7,015,913 B1 * 3/2006 Lindholm et al. ............ 345/501
2009/0228691 A1 9/2009 Furuta et al.

FOREIGN PATENT DOCUMENTS

CN            101111818         1/2008

OTHER PUBLICATIONS

English language translation of abstract of CN 101111818 (published Jan. 23, 2008).

* cited by examiner

*Primary Examiner* — Corey S Faherty
(74) *Attorney, Agent, or Firm* — McClure, Qualey & Rodack, LLP (57) ABSTRACT

Methods for instruction execution and synchronization in a multi-thread processor are provided, wherein in the multi-thread processor, multiple threads are running and each of the threads can simultaneously execute a same instruction sequence. A source code or an object code is received and then compiled to generate the instruction sequence. Instructions for all of function calls within the instruction sequence are sorted according to a calling order. Each thread is provided a counter value pointing to one of the instructions in the instruction sequence. A main counter value is determined according to the counter values of the threads such that all of the threads simultaneously execute an instruction of the instruction sequence that the main counter value points to.

14 Claims, 7 Drawing Sheets

FIG. 1

```
extern int a ;
void CallFunction ( )
{
  a++ ;
  Return
} void main  ( )
{
  int b ;
  a++;
  for(b = 0 ; b < 100 ; b++)
  {
    If(a == 0)
    {
      Do things;
      Break;
    }
    Else if(a == 1)
    {
      CallFunction( );
      Break;
    }
    Else if(a < 5)
    {
      Do things 2;
      Break;
    }
    Do things 3.
  }
}
```

| Line | Shader code | Note |
|---|---|---|
| 1 | JMP 4 | To Main |
| 2 | a++ | a++ (Call Function) |
| 3 | JMP 14 | Back to Main |
| 4 | a++ | Main a++ |
| 5 | Cmp_lt P1, R1, 100 | b < 100 |
| 6 | JNZ P1, 7, 22 | Loop in or out |
| 7 | Cmp_eq P2, R0, 0 | a == 0 |
| 8 | JNZ P2, 9, 11 | If(a == 0) |
| 9 | Do Things | Do Things |
| 10 | JMP 22 | Break |
| 11 | Cmp_eq P2, R0, 1 | a == 1 |
| 12 | JNZ P2, 13, 15 | If(a == 1) |
| 13 | JMP 2 | To CallFunction |
| 14 | JMP 22 | Break |
| 15 | Cmp_lt P1, R0, 5 | a < 5 |
| 16 | JNZ P1, 17, 19 | If(a < 5) |
| 17 | Do things 2 | Do things 2 |
| 18 | JMP 22 | Break |
| 19 | Do things 3 | Do things 3 |
| 20 | Add R1, R1, 1 | b++ |
| 21 | JMP 5 | Next loop |
| 22 | End | End |

| PC_A | PC_B | PC_C | PC_D | PC | A_Status | B_Status | C_Status | D_Status |
|---|---|---|---|---|---|---|---|---|
| 1 | 1 | 1 | 1 | 1 | JMP 4 | JMP 4 | JMP 4 | JMP 4 |
| 4 | 4 | 4 | 4 | 4 | a++; a=2 | a++; a=3 | a++; a=4 | a++; a=1 |
| 5 | 5 | 5 | 5 | 5 | b < 100 | b < 100 | b < 100 | b < 100 |
| 6 | 6 | 6 | 6 | 6 | In loop | In loop | In loop | In loop |
| 7 | 7 | 7 | 7 | 7 | a==0? | a==0? | a==0? | a==0? |
| 8 | 8 | 8 | 8 | 8 | Failed | Failed | Failed | Failed |
| 11 | 11 | 11 | 11 | 11 | a==1? | a==1? | a==1? | a==1? |
| 12 | 12 | 12 | 12 | 12 | Failed | Failed | Failed | Succeed |
| 15 | 15 | 15 | 13 | 13 | Useless | Useless | Useless | JMP 2 |
| 15 | 15 | 15 | 2 | 2 | Useless | Useless | Useless | a++; a=2 |
| 15 | 15 | 15 | 3 | 3 | Useless | Useless | Useless | JMP 14 |
| 15 | 15 | 15 | 14 | 14 | Useless | Useless | Useless | JMP 22 |
| 15 | 15 | 15 | 22 | 15 | a < 5 | a < 5 | a < 5 | Useless |
| 16 | 16 | 16 | 22 | 16 | Succeed | Succeed | Succeed | Useless |
| 17 | 17 | 17 | 22 | 17 | Do things 2 | Do things 2 | Do things 2 | Useless |
| 18 | 18 | 18 | 22 | 18 | JMP 22 | JMP 22 | JMP 22 | Useless |
| 22 | 22 | 22 | 22 | 22 | End | End | End | End |

MULTI-THREAD PROCESSORS AND METHODS FOR INSTRUCTION EXECUTION AND SYNCHRONIZATION THEREIN AND COMPUTER PROGRAM PRODUCTS THEREOF

CROSS REFERENCE TO RELATED APPLICATIONS

This Application claims priority of China Patent Application No. 201010531885.x, filed on Nov. 4, 2010, the entirety of which is incorporated by reference herein.

BACKGROUND OF THE INVENTION

1. Field of the Invention

The invention relates to methods and systems for instruction execution and synchronization, and more particularly, to methods and systems for instruction execution and synchronization in a multi-thread processor.

2. Description of the Related Art

Recently, with the improvement in computer technologies and growth in processor designs, multi-thread processors which are processors with multiple threads have been widely used in many applications. The term "multi-thread" refers to a technique that allows multiple threads being executed in parallel, which may be implemented by software or hardware. Processing/computer systems with multi-thread may execute more than one thread at the same time, thus improving the overall processing performance of the system.

In general, parallel processing of multiple threads may be achieved by sequentially executing the instructions to separately control each of the threads or by indicating in the instructions to achieve the same goal for parallel processing of multiple threads. For the method of indicating in the instructions, it is required to configure a prediction register for each instruction (e.g. one bit data may be added into each instruction) and the compiler may then determine whether to skip an instruction according to whether the prediction register of the instruction is indicated as 1 or 0. By doing so, however, more complicated control logic units may be required and thus overhead of the compiler and the hardware complexity of the system may also be increased.

BRIEF SUMMARY OF THE INVENTION

Methods and apparatuses for instruction execution and synchronization in a multi-thread processor are provided.

In one embodiment, a method for instruction execution and synchronization in a multi-thread processor is provided, wherein multiple threads are running in the multi-thread processor and each of the threads can simultaneously execute a same instruction sequence. The method comprises the following steps. A source code or an object code is received and then is compiled to generate the instruction sequence. Instructions for all of function calls within the instruction sequence are sorted according to a calling order. Each thread is provided a counter value pointing to one of the instructions in the instruction sequence. A main counter value is determined according to the counter values of the threads such that all of the threads simultaneously execute an instruction of the instruction sequence that the main counter value points to.

Another exemplary embodiment of a multi-thread processor at least comprises a plurality of logic units, wherein each of the logic units runs one of multiple threads and the threads can simultaneously execute a same instruction sequence. Each of the threads includes a counter value, each counter value pointing to an instruction in the instruction sequence. The multi-thread processor further comprises a comparator for determining a main counter value according to the counter values of the logic units such that all of the logic units simultaneously execute the instruction of the instruction sequence that the main counter value points to.

Methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
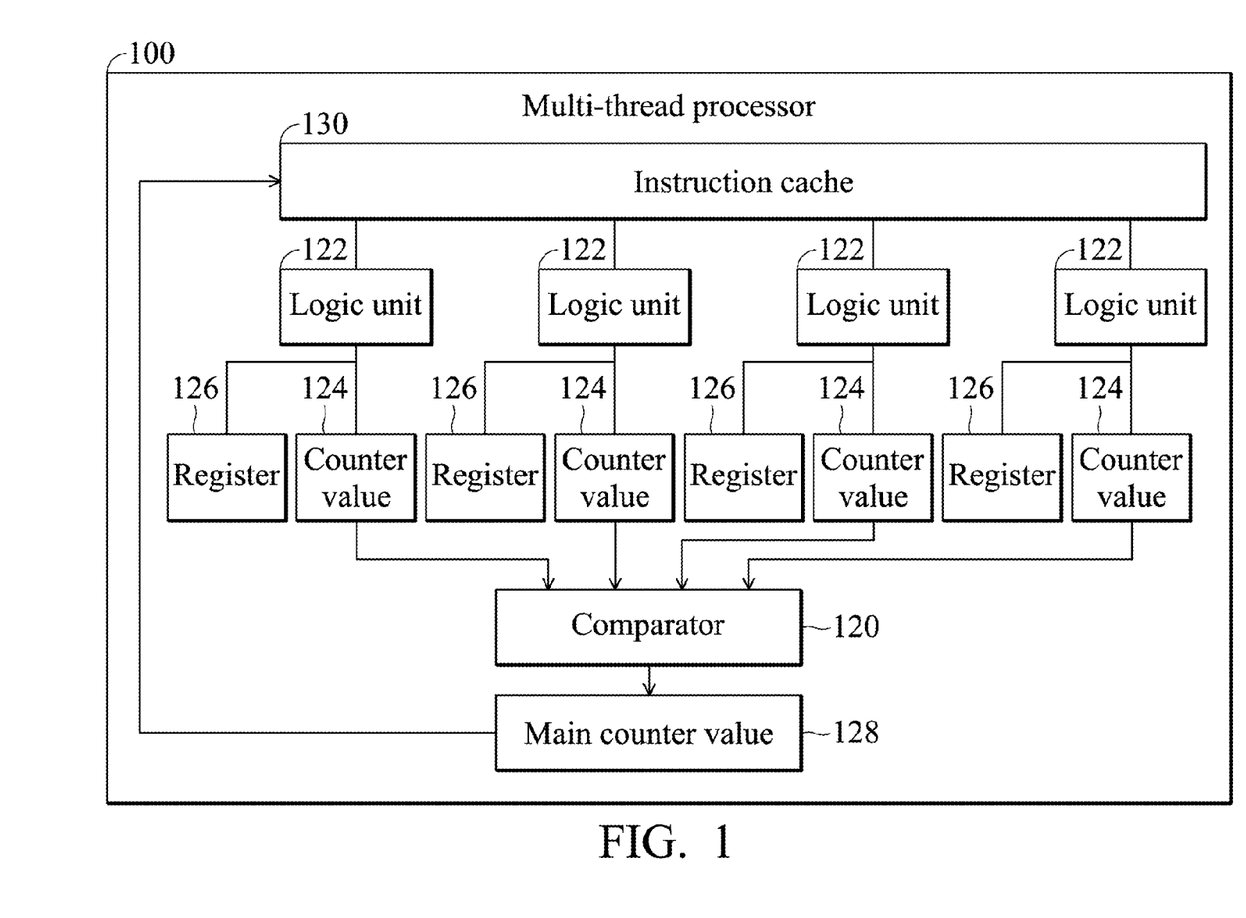
FIG. 1 is a schematic diagram illustrating an embodiment of a multi-thread processor of the invention.

FIG. 1 is a schematic diagram illustrating an embodiment of a multi-thread processor of the invention. The multi-thread processor 100 at least comprises multiple logic units 122 (e.g. arithmetic logic unit (ALUs)), wherein each logic unit 122 may run one of multiple threads and these threads may simultaneously execute an instruction sequence. Each logic unit 122 further includes a counter value 124, wherein each counter value 124 points to one of instructions in the instruction sequence. Particularly, the instruction that the counter value 124 of one logic unit 122 points to is the instruction to be executed next for the thread which is run in that logic unit 122. In one embodiment, each logic unit 122 may configure a register or a program counter to store the counter value thereof. In addition, each logic unit 122 of the multi-thread processor 100 may also configure a register (which is so-called status register) 126 for storing an execution result for the instructions. It should be noted that, although only four logic units 122 are illustrated in FIG. 1, but the invention is not limited thereto. In other words, the number of the logic units 122 may be increased or decreased according to requirement.

The multi-thread processor 100 may further comprise a comparator 120 which determines a main counter value 128 according to all of the counter values 124 of all of the logic units 122 such that all of the logic units 122 may simultaneously execute the instruction of the instruction sequence that the main counter value 128 points to. In one embodiment, the instruction sequence may be stored in an instruction buffer 130, and each of the logic units 122 may retrieve an instruction that the main counter value 128 points to from the instruction buffer 130 based on the main counter value 128 and then execute the retrieved instruction at the same time. In another embodiment, the comparator 120 may find a minimum counter value among all of the counter values of all of the logic units 122 and configure the minimum counter value as the main counter value 128. It is to be noted that, although the counter values 124 and the main counter value 128 illustrated in FIG. 1 are stored inside the multi-thread processor 100, but the invention is not limited thereto. In other words, the counter values 124 and the main counter value 128 may be stored inside or outside the multi-thread processor 100 according to requirement.

In some embodiments, after all of the logic units 122 simultaneously execute the instruction of the instruction sequence that the main counter value 128 points to, each logic unit 122 may compare its counter value 124 with the main counter value 128 and then determine whether to write back the execution result to its register 126 based on the comparison result. When the counter value 124 of one of the logic units 122 is equal to the main counter value 128, this logic unit 122 writes the execution result of the instruction into its register 126. When the counter value 124 of the logic unit 122 is not equal to the main counter value 128, the logic unit 122 may ignore the execution result of the instruction or write a USELESS mark into its register 126. In other words, when the counter value 124 of one of the logic units 122 is not equal to the main counter value 128, this logic unit 122 will not write back the execution result to its register 126.

In some embodiments, the multi-thread processor 100 may further provide each logic unit 122 a flag and the multi-thread processor 100 is configured to set (e.g. set the flag to be 1) or clear the flag (e.g. set the flag to be 0) according to a comparison result of whether the corresponding counter value 124 is equal to the main counter value 128 for each logic unit 122. A logic unit 122 sets the flag when the counter value 124 of this logic units 122 is equal to the main counter value 128; while the logic unit 122 clears the flag when the counter value 124 of the logic unit 122 is not equal to the main counter value 128. Thereafter, whether to write back the execution result to the corresponding buffer 126 may be determined based on the flag.

In some embodiments, when the threads run in all of the logic units 122 simultaneously execute the same instruction under aforementioned rule (e.g. a minimum counter value among all of the counter values 124 is configured as the main counter value 128), to insure that every instructions in the instruction sequence can be executed, the compiler of the multi-thread processor 100 should insure that the instruction sequence has an instruction execution order while compiling the source code or the object code of the instruction sequence to generate the instruction sequence. In one embodiment, the compiler may be implemented by a driver form of the multi-thread processor 100. In another embodiment, the multi-thread processor 100 may comprise, for example, a graphic processing unit (GPU), but it is not limited thereto. When the multi-thread processor 100 is a GPU, the instruction sequence may be referred to as a shader code.

Figure 2:
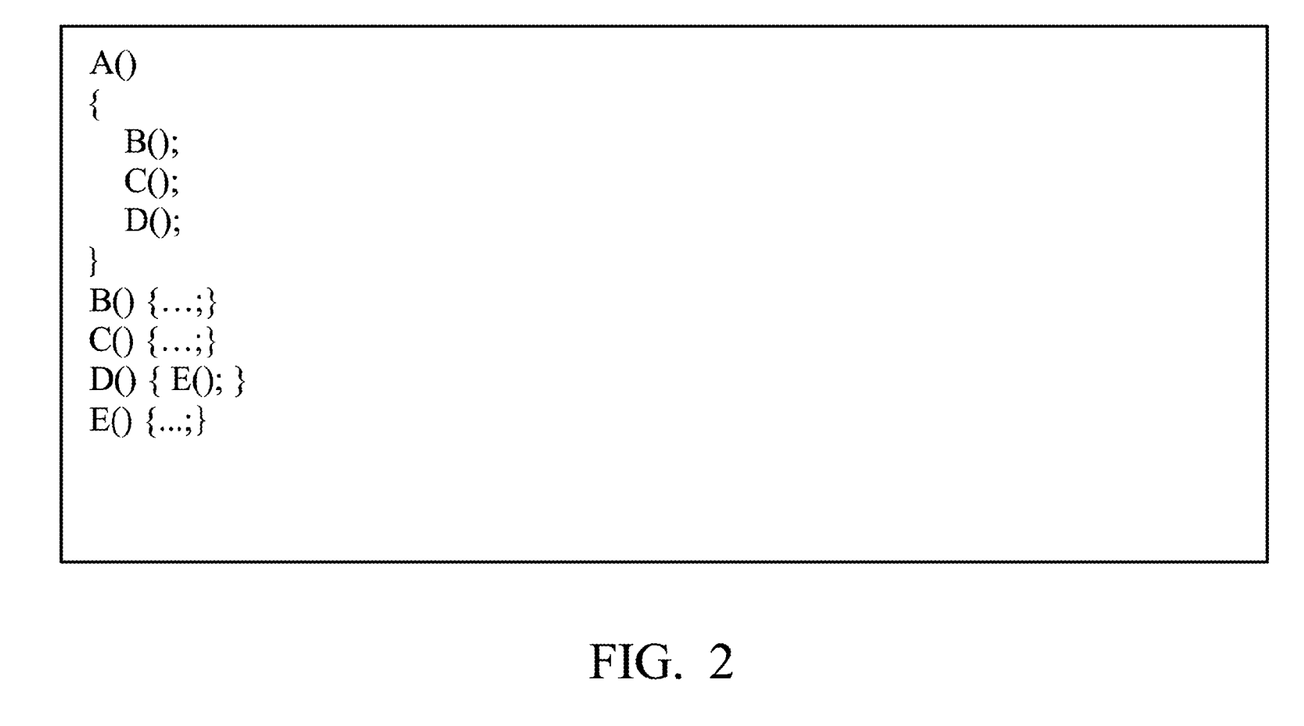
FIG. 2 illustrates an embodiment of an exemplary pseudo program code of the invention.

The compiler may sort all of functions within the instruction sequence according to a calling order such that instructions of each called function (i.e. the sub function) in the instruction sequence are arranged in front of instructions of a corresponding calling function which calls the called function (i.e. the parent function). Description of how to sort all of functions within the instruction sequence according to a calling order is detailed with referring to FIG. 2. FIG. 2 illustrates an embodiment of an exemplary pseudo program code of the invention. As shown in FIG. 2, the source code 200 includes functions A-E, wherein functions B, C and D are called by function A and function E is further called by function D. As the function D calls the function E, instructions of the function E will be arranged in front of those of the function D during instruction sorting. Similarly, as the function A calls the functions B, C and D, instructions of the functions B, C and D will be arranged in front of those of the function A during instruction sorting. Thus, in this embodiment, the calling order for the functions A-E can be defined as (E, B, C, D, A).

Figure 3A:
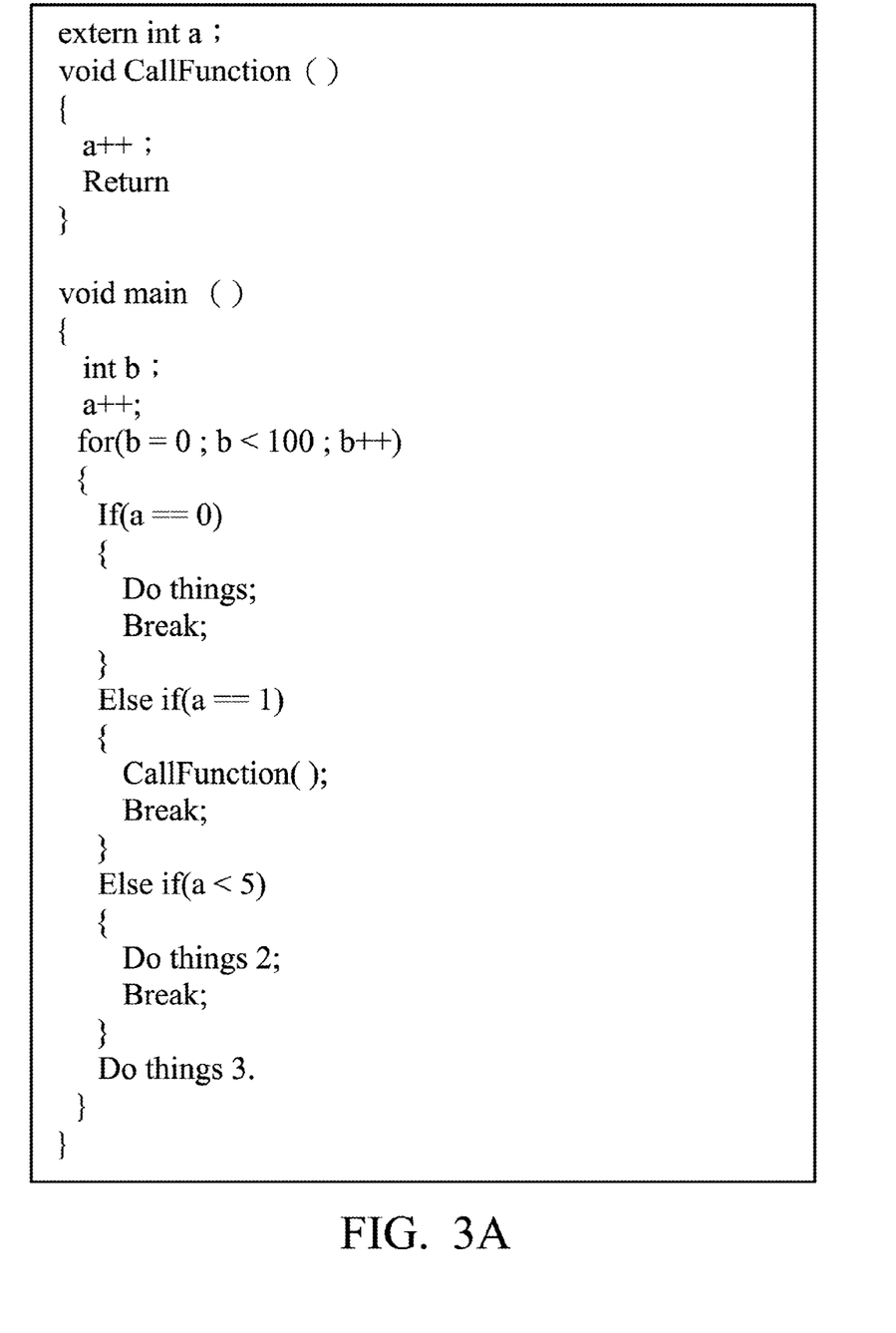
FIG. 3A illustrates an embodiment of a C language source code of the invention.
Figure 3B:
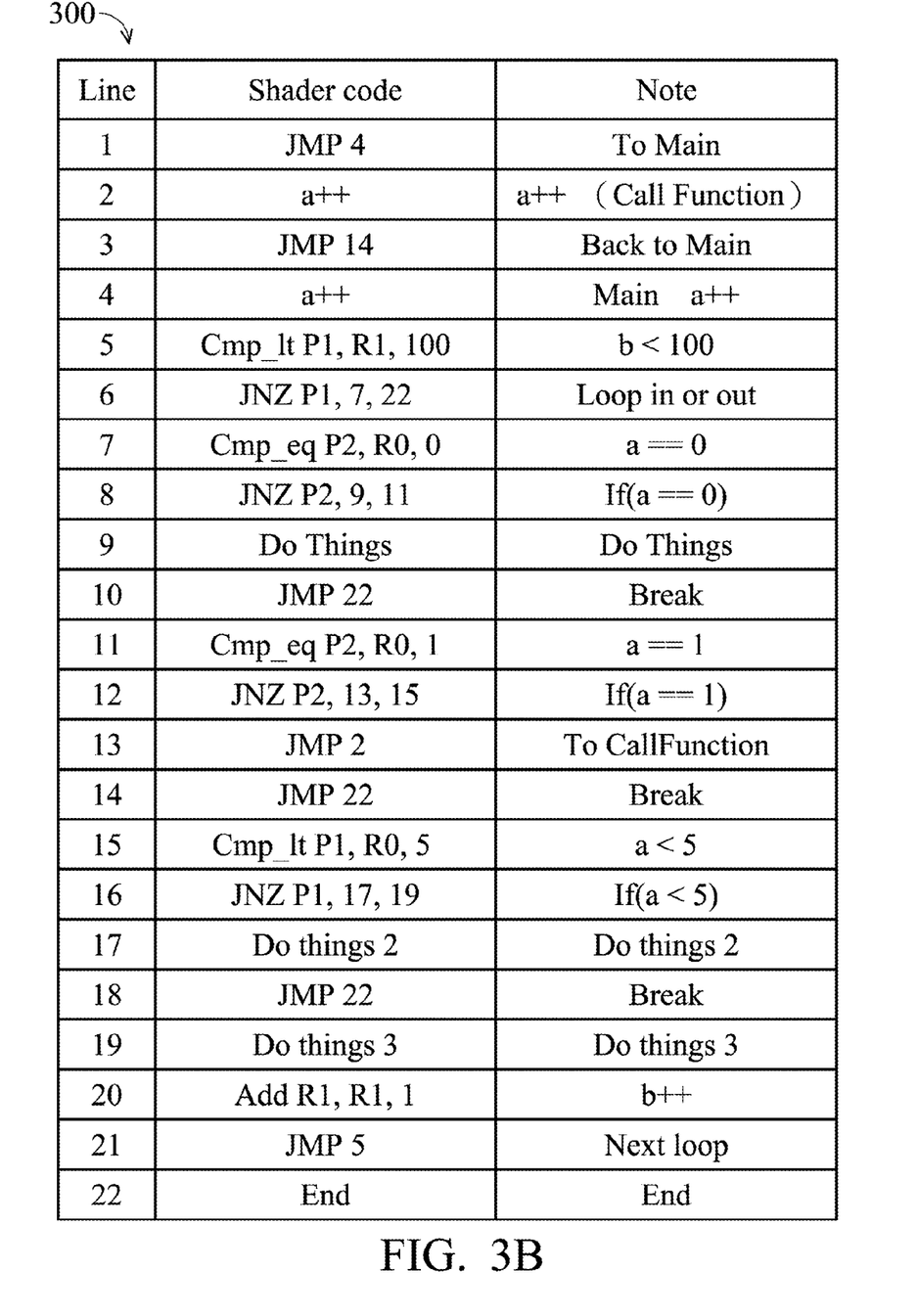
FIG. 3B illustrates an embodiment of an instruction sequence corresponding to the C language source code shown in FIG. 3A of the invention.

Referring to both FIG. 3A and FIG. 3B. FIG. 3A illustrates an embodiment of a C language source code of the invention. FIG. 3B illustrates an embodiment of an instruction sequence generated by compiling the C language source code shown in FIG. 3A of the invention. In FIG. 3B, label "Line" indicates the execution order/the line number for the instruction, label "Shader code" indicates the corresponding compiled result, and label "Note" indicates which operation will be executed by the instruction, wherein the instruction with a smaller line number will be executed earlier. As shown in FIG. 3B, a instruction sequence 300 includes instructions with line numbers 1-22. Referring to FIG. 3A, as the function CallFunction is called by the function Main, instructions of the function CallFunction will be arranged in front of those of the corresponding calling function Main in the instruction sequence 300. In other words, in the instruction sequence 300, the line numbers for instructions of the function CallFunction (i.e. for those instructions with line numbers 2-3 in FIG. 3A) are smaller than those for instructions of the function Main (i.e. for those instructions with line numbers 4-22 in FIG. 3A). Generally, the instruction sequence 300 may comprise a main function (i.e. the function Main in FIG. 3A) and this main function is typically arranged at the tail of the instruction sequence 300 to match the aforementioned rule on which the instructions are sorted according to the calling order of the functions.

During execution, the multi-thread processor 100 may sequentially execute the instructions in the instruction sequence 300 according to the order of the line numbers of the instruction sequence 300. Because instructions of each called function in the instruction sequence 300 are arranged in front of instructions of a corresponding calling function which calls the called function, it can be insured that every instructions in the instruction sequence 300 can be executed when the multiple threads run in the multiple logic units 22 of the multi-thread processor 100 simultaneously execute the same instruction which is the instruction of the instruction sequence 300 that the minimum counter value, among all of the counter values 124, points to. Of course, in some embodiments, the instruction execution order of the instruction sequence 300 may also be arranged by other sorting algorithm, such as instructions of each called function in the instruction sequence 300 are arranged in back of instructions of a corresponding calling function which calls the called function and the multi-thread processor 100 may sequentially execute the instructions in the instruction sequence 300 in descending order according to the order of the line numbers of the instruction sequence 300. Respectively, in this case, the comparator 120 may find out a maximum counter value among all of the counter values 124 of all of the logic units 122 and then configure the maximum counter value as the main counter value 128.

Methods for instruction execution and synchronization in a multi-thread processor will be discussed and detailed in below.

Figure 4:
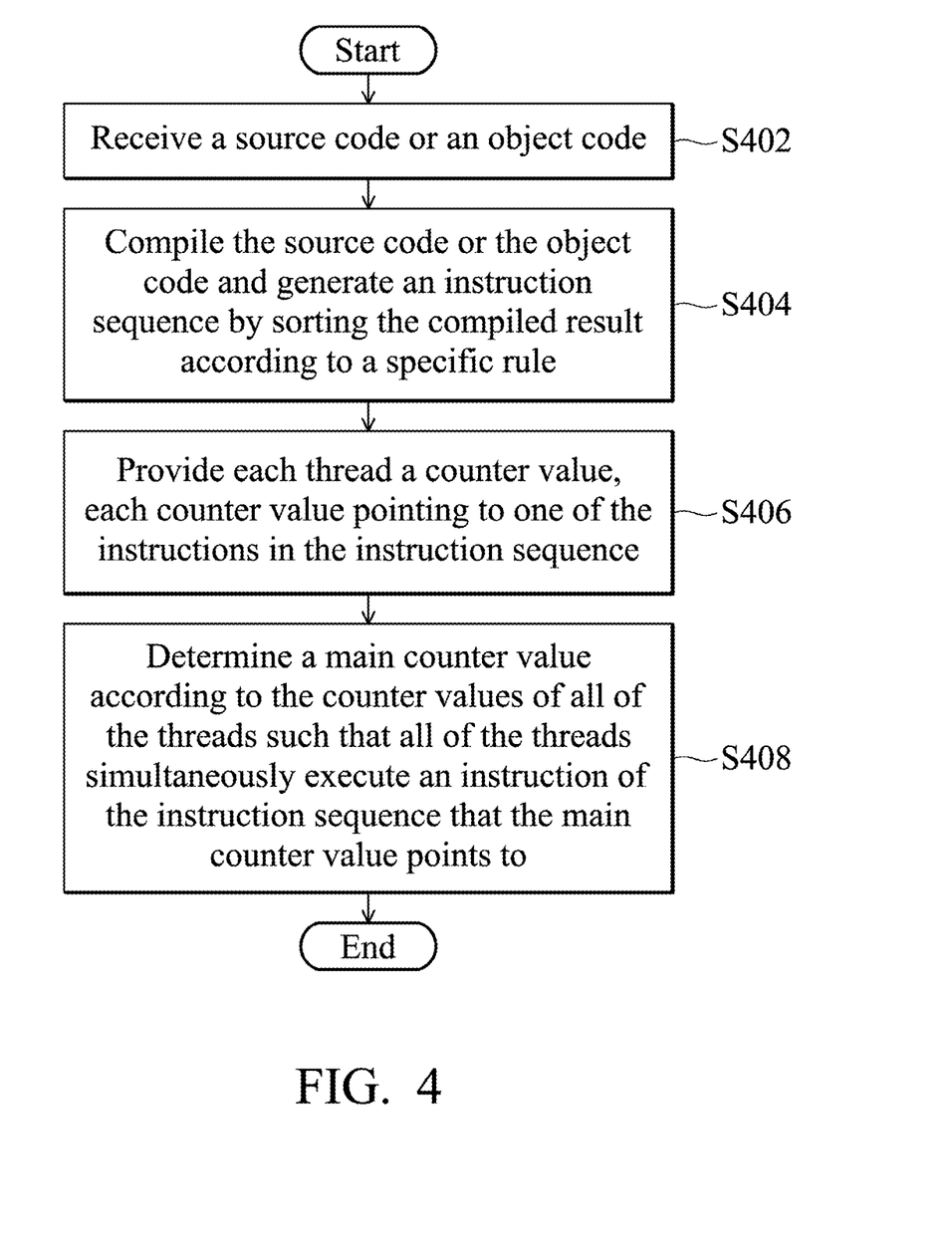
FIG. 4 is a flowchart of an embodiment of a method for instruction execution and synchronization in a multi-thread processor of the invention.

FIG. 4 is a flowchart of an embodiment of a method for instruction execution and synchronization in a multi-thread processor of the invention. Please refer to FIG. 1, FIG. 3B and FIG. 4. The multi-thread processor 100 may comprise, for example, a graphic processing unit (GPU), but it is not limited thereto. In addition, multiple threads are running in the multi-thread processor 100 and all of the threads can simultaneously execute a same instruction sequence (e.g. the instruction sequence 300 shown in FIG. 3B). First, in step S402, the compiler of the multi-thread processor 100 receives a source code (e.g. the source code shown in FIG. 3A) or an object code, and in step S404, compiles the source code or the object code to generate the instruction sequence (e.g. the instruction sequence 300 shown in FIG. 3B). In this step, when receiving a source code, the compiler first compiles the source code and then sorts the compiled results according to a calling order, e.g. the compiled results are sorted such that instructions of each called function in the instruction sequence are arranged in front of instructions of a corresponding calling function which calls the called function. In other words, the instructions could be arranged, from bottom to top, in the instruction buffer 130 or other instruction buffers (not shown) (i.e. the main function is arranged to the tail of the instruction sequence 300, the functions being directly called by the main function are arranged subsequent to the main function, and so on) according to the calling order of the functions in descending order (i.e. the main function is set to be the highest layer, the functions being directly called by the main function are set to the second highest layer, and so on) by the compiler. For example, as the function CallFunction is called by the function Main, instructions of the function CallFunction (i.e. those instructions with line numbers 2-3 in FIG. 3A) will be arranged in front of those of the corresponding calling function Main (i.e. those instructions with line numbers 4-22 in FIG. 3A) in the instruction sequence 300.

When the instruction sequence 300 has been generated, the instruction sequence 300 will be stored in the instruction buffer 130 to wait for execution by the multi-thread processor 100.

Thereafter, when the instruction sequence 300 is to be executed, in step S406, the multi-thread processor 100 provides a counter value 124 for each thread, wherein each counter value 124 points to one of instructions in the instruction sequence 300. Particularly, each counter value 124 is used for recording the location of the instruction (e.g. the line number of the instruction) that should be executed next for the corresponding thread in the corresponding logic unit 122. Next, in step S408, the multi-thread processor 100 determines a main counter value 128 according to all of the counter values 124 of all of the logic units 122 such that all of the logic units 122 may simultaneously execute the instruction of the instruction sequence 300 that the main counter value 128 points to. In some embodiments, the multi-thread processor 100 may find a minimum counter value among all of the counter values 124 and configure the minimum counter value as the main counter value 128 for determination of the main counter value 128.

After determining the main counter value 128, the multi-thread processor 100 may find the instruction corresponding to the main counter value 128 from the instruction buffer 130 and issues the found instruction to all of the threads for execution. Therefore, all of the threads may simultaneously execute the found instruction and generate execution results corresponding thereto.

In some embodiments, the multi-thread processor 100 may compare the counter value 124 of each thread with the main counter value 128 and then determine whether to write back the execution result to its register 126 based on the comparison result corresponding thereto. When the counter value 124 of one of the threads is equal to the main counter value 128, the multi-thread processor 100 writes the execution result of the instruction into the register 126 of the logic unit 122 corresponding to this thread. When the counter value 124 of the thread is not equal to the main counter value 128, the multi-thread processor 100 ignores the execution result of the instruction or writes a USELESS mark into the register 126 of the logic unit 122 corresponding to this thread. In other words, when the counter value 124 of one of the threads is not equal to the main counter value 128, the multi-thread processor 100 will not write back the execution result to the register 126 of the logic unit 122 corresponding to this thread.

In some embodiments, the multi-thread processor 100 may further provide a flag for each thread and may set (e.g. set the flag to be 1) or clear the flag (e.g. set the flag to be 0) according to a comparison result of whether the corresponding counter value 124 is equal to the main counter value 128 for each thread. The flag is set when the counter value 124 of one of the threads is equal to the main counter value 128 while the flag is cleared when the counter value 124 of the thread is not equal to the main counter value 128. Thereafter, whether to write back the execution result to the corresponding buffer 126 may be determined based on the flag.

Figure 5:
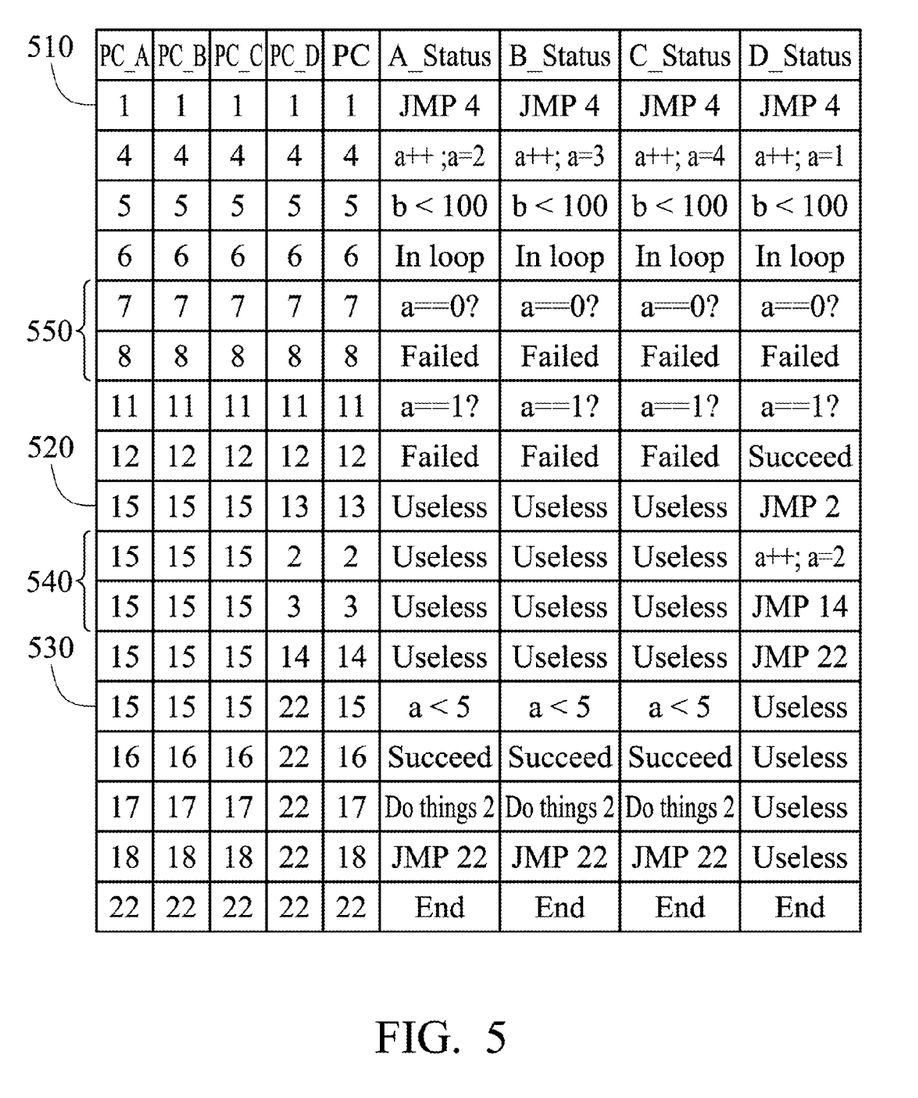
FIG. 5 is a schematic diagram illustrating an embodiment of an exemplary variation in register contents according to the counter value for illustrating an implement of the method for instruction execution and synchronization in a multi-thread processor of the invention.

For explanation, one specific embodiment is illustrated in the following to explain the detailed process of a method for instruction execution and synchronization in a multi-thread processor of the invention, and those skilled in the art will understand that this specific embodiment is used for explanation only and the invention is not limited thereto. FIG. 5 is a schematic diagram illustrating an embodiment of an exemplary variation in register contents according to the counter value for illustrating an implement of the method for instruction execution and synchronization in a multi-thread processor of the invention. Please refer together to FIG. 1, FIG. 3B, FIG. 4 and FIG. 5. In this embodiment, it is assumed that four logic units 122 of the multi-thread processor 100 including four threads A, B, C and D running the instruction sequence 300 shown in FIG. 3B at the same time and initial values of a variable a for the threads A, B, C and D are 1, 2, 3, 0, respectively. As shown in FIG. 5, PC_A, PC_B, PC_C and PC_D respectively represent the counter value corresponding to the four threads A, B, C and D, PC represents the main counter value and A_status, B_status, C_status and D_status respectively represent the content stored in the register corresponding to the four threads A, B, C and D. For example, in line labeled by 510, PC_A, PC_B, PC_C and PC_D are equal to 1, thus the main counter value PC is also equal to 1, which means that all of four threads A, B, C and D are executing the instruction with line number 1 "JMP 4", and contents stored in A_status, B_status, C_status and D_status are "JMP 4". In line labeled by 520 of FIG. 5, PC_A, PC_B, PC_C are equal to 15 and PC_D is equal to 13, the main counter value PC is thus configured to the minimum value of the PC_A, PC_B, PC_C and PC_D (i.e. 13), which means that all of four threads A, B, C and D are executing the instruction with line number 13 "JMP 2". However, as only the value of PC_D is equal to that of PC, the content stored in D_status is "JMP 2". Meanwhile, as the values of PC_A, PC_B and PC_C are not equal to that of PC, the execution result will not be stored in A_status, B_status and C_status or the stored content are "Useless".

Similarly, in line labeled by 530 of FIG. 5, PC_A, PC_B, PC_C are equal to 15 and PC_D is equal to 22, the main counter value PC is thus configured to the minimum value of the PC_A, PC_B, PC_C and PC_D (i.e. 15), which means that all of four threads A, B, C and D are executing the instruction with line number 15 "a<5?". However, as only the values of PC_A, PC_B and PC_C are equal to that of PC, the contents stored in A_status, B_status and C_status are "a<5?". Meanwhile, as the value of PC_D is not equal to that of PC, the execution result will not be stored in D_status or the stored content is "Useless".

In lines labeled by 540 of FIG. 5, PC_A, PC_B and PC_C are equal to 15 and PC_D is equal to 2, the main counter value PC is thus configured to the minimum value of the PC_A, PC_B, PC_C and PC_D (i.e. 2), which means that all of four threads A, B, C and D are executing the instruction with line number 2 "a++" (i.e. executing the function CallFunction which is called by the function Main). Because the line number of the function CallFunction is smaller than that of the function Main so that the instructions of the function CallFunction can be executed by a selection rule that the instruction with the smallest line number is selected first.

Figure 6:
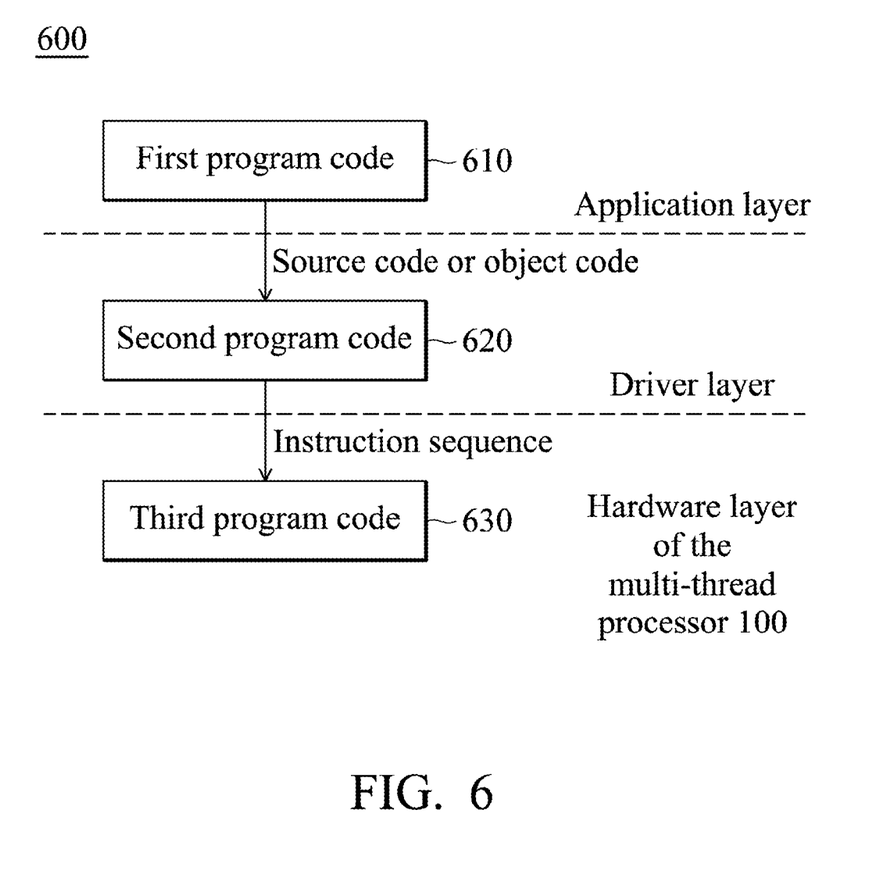
FIG. 6 is a schematic diagram illustrating an embodiment of a system for instruction execution and synchronization of a multi-thread processor of the invention.

FIG. 6 is a schematic diagram illustrating an embodiment of a system for instruction execution and synchronization of a multi-thread processor of the invention. The system 600 for instruction execution and synchronization of the multi-thread processor may perform the method for instruction execution and synchronization in the multi-thread processor 100, wherein multiple threads are running in the multi-thread processor 100 and all of the threads can simultaneously execute a same instruction sequence. The system 600 for instruction execution and synchronization of a multi-thread processor may include: a first program code 610 for obtaining a source code or an object code as shown in FIG. 3A, wherein in one embodiment, the first program code 610 may be implemented by an application of the application layer of the system; a second program code 620 for compiling the source code or the object code obtained by the first program code 610 to generate the instruction sequence 300 as shown in FIG. 3B, wherein instructions of each called function in the instruction sequence 300 are arranged in front of instructions of a corresponding calling function which calls the called function and wherein in one embodiment, the second program code 620 may be implemented by a driver of the multi-thread processor 100 for the driver layer of the system; and a third program code 630 for providing a counter value for each thread, each counter value pointing to one of the instructions in the instruction sequence 300, determining a main counter value according to the counter values of the threads such that all of the threads simultaneously execute an instruction of the instruction sequence that the main counter value points to, wherein in one embodiment, the third program code 630 may be implemented by a hardware code of the multi-thread processor 100 for the hardware layer of the system.

In summary, according to the methods and systems for instruction execution and synchronization of a multi-thread processor of the invention, by the specific ordering for the compiled results and a selection rule that the instruction with the smallest line number is selected first for all of the running threads, function blocks which are unnecessary to be executed by all of the threads (e.g. the execution of the instructions in lines 9 and 10 will be skipped by all of the threads A-D according to instructions with lines label by 550 of FIG. 5) can be directly skipped, thus providing a higher execution performance. Moreover, according to the method for instruction execution and synchronization of a multi-thread processor of the invention, the aforementioned smallest line number rule is applied to determine next instruction to be executed for all of the threads and thus no specific controller is required for instruction sorting, significantly simplifying the hardware architecture. In addition, as all of the threads simultaneously execute the same instruction of the instruction sequence, it is convenience to complete those tasks that all of the threads are requested to execute simultaneously. Furthermore, in addition to be applied to graphic processors, the method for instruction execution and synchronization of a multi-thread processor may further be applied to other system architectures with multiple threads, such as the coprocessor architecture utilizing the graphic processor as the processing unit or general purpose calculations for x86-based processors.

Systems and method for instruction execution and synchronization in a multi-thread processor thereof, or certain aspects or portions thereof, may take the form of a program code (i.e., executable instructions) embodied in tangible media, such as floppy diskettes, CD-ROMs, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for instruction execution and synchronization in a multi-thread processor, wherein multiple threads are running in the multi-thread processor and each of the threads can simultaneously execute a same instruction sequence, the method comprising:
   receiving a source code or an object code;
   compiling the source code or the object code to generate the instruction sequence, wherein instructions for all of function calls within the instruction sequence are sorted according to a calling order;
   providing each thread a counter value, each counter value pointing to one of the instructions in the instruction sequence; and
   determining a main counter value according to the counter values of the threads such that all of the threads simultaneously execute the instruction of the instruction sequence that the main counter value points to.

2. The method as claimed in claim 1, further comprising:
   comparing the counter value of one of the threads with the main counter value; and writing an execution result of the instruction into a register corresponding to the one of the threads when the counter value of the one of the threads is equal to the main counter value.

3. The method as claimed in claim 2, further comprising:
ignoring the execution result of the instruction or writing a USELESS mark into the register corresponding to the one of the threads when the counter value of the one of the threads is not equal to the main counter value.

4. The method as claimed in claim 1, wherein the step of determining the main counter value according to the counter values of the threads further comprises:
finding a minimum counter value among the counter values; and
configuring the minimum counter value as the main counter value.

5. The method as claimed in claim 4, wherein instructions of each called function in the instruction sequence are arranged in front of instructions of a corresponding calling function which calls the called function after sorting of the instructions within the instruction sequence is completed.

6. A multi-thread processor, comprising:
a plurality of logic units, wherein each of the logic units runs one of multiple threads and the threads can simultaneously execute a same instruction sequence, wherein each of the threads includes a counter value, each counter value pointing to an instruction in the instruction sequence; and
a comparator, determining a main counter value according to the counter values of the logic units such that all of the logic units simultaneously execute the instruction of the instruction sequence that the main counter value points to.

7. The multi-thread processor as claimed in claim 6, wherein each of the logic units further comprises a register and one of the logic units compares the counter value of the one of the logic units with the main counter value, and when the counter value of the one of the logic units is equal to the main counter value, writes an execution result of the instruction into a register corresponding to the one of the logic units.

8. The multi-thread processor as claimed in claim 7, wherein the one of the logic units ignores the execution result of the instruction or writes a USELESS mark into the register corresponding to the one of the logic units when the counter value of the one of the logic units is not equal to the main counter value.

9. The multi-thread processor as claimed in claim 7, wherein each of the logic units further include a flag, and each logic unit is configured to set or clear the flag according to a comparison result of whether the counter value corresponding thereto is equal to the main counter value, wherein the one of the logic units sets the flag when the counter value of the one of the logic units is equal to the main counter value; while the one of the logic units clears the flag when the counter value of the one of the logic units is not equal to the main counter value.

10. The multi-thread processor as claimed in claim 6, wherein the comparator finds a minimum counter value among the counter values and configures the minimum counter value as the main counter value.

11. The multi-thread processor as claimed in claim 10, wherein instructions of each called function in the instruction sequence are arranged in front of instructions of a corresponding calling function which calls the called function.

12. The multi-thread processor as claimed in claim 6, further comprising an instruction buffer and the logic unit finds the instruction corresponding to the main counter value from the instruction buffer and issues the instruction to all of the logic units for execution.

13. The multi-thread processor as claimed in claim 6, wherein the multi-thread processor comprises a graphic processing unit (GPU).

14. A non-transitory machine-readable storage medium comprising a computer program, which, when executed, causes an apparatus to perform a method for instruction execution and synchronization in a multi-thread processor, wherein multiple threads are running in the multi-thread processor and each of the threads can simultaneously execute a same instruction sequence, the method comprising:
receiving a source code or an object code;
compiling the source code or the object code to generate the instruction sequence, wherein instructions for all of function calls within the instruction sequence are sorted according to a calling order;
providing each thread a counter value, each counter value pointing to one of the instructions in the instruction sequence; and
determining a main counter value according to the counter values of the threads such that all of the threads simultaneously execute the instruction of the instruction sequence that the main counter value points to.

* * * * *

UNITED STATES PATENT AND TRADEMARK OFFICE
CERTIFICATE OF CORRECTION

PATENT NO. : 8,838,941 B2  
APPLICATION NO. : 13/042996  
DATED : September 16, 2014  
INVENTOR(S) : Zhang Page 1 of 1

It is certified that error appears in the above-identified patent and that said Letters Patent is hereby corrected as shown below:

On the title page, item (30) the date of the foreign application priority data should be changed from "Mar. 8, 2011" to --Nov. 4, 2010--

Signed and Sealed this  
Sixteenth Day of December, 2014

Michelle K. Lee  
*Deputy Director of the United States Patent and Trademark Office*